Figure 1:
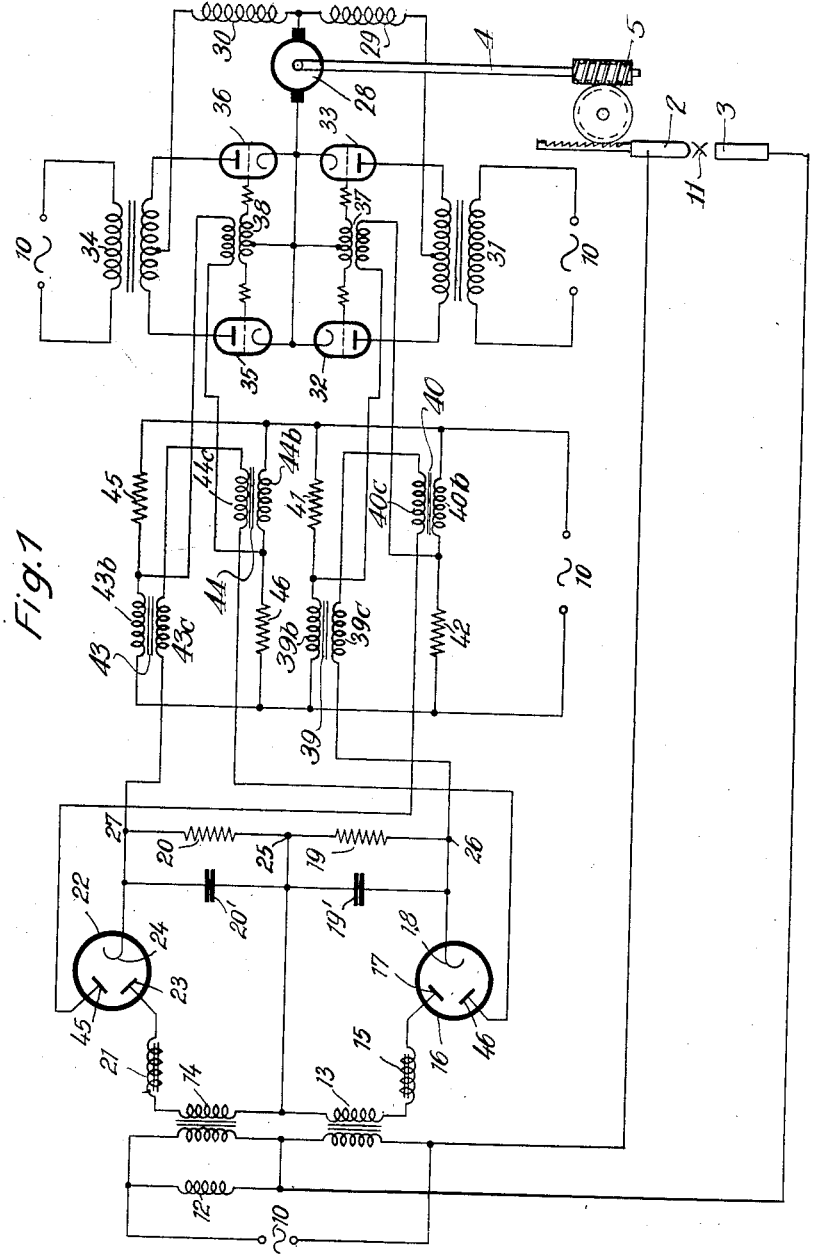

Patented Mar. 11, 1941

2,234,239

UNITED STATES PATENT OFFICE 2,234,239

AUTOMATIC REGULATION AND CONTROL OF THE ELECTRODES OF AN ELECTRIC ARC FURNACE

Klaus Freudenhammer, Berlin-Charlottenburg, Germany, assignor to Patentverwertungs-Gesellschaft mit beschrankter Haftung, "Hermes", Berlin, Germany, a corporation of Germany Application March 15, 1939, Serial No. 262,071
In Germany March 15, 1938

14 Claims. (Cl. 13—13)

The present invention relates to the automatic regulation and control of the electrodes of an electric arc furnace.

A primary object of the invention is the provision of means for adjusting the electrodes of an arc furnace and a method and apparatus for automatically regulating and controlling the operation of such adjusting means in accordance with changes in the requirements of operation.

It is another object of the invention to provide a device for comparing the current and voltage of the arc of an electric furnace with one another and for using the difference or deviation of the ratio thus ascertained from a predetermined ratio of voltage and current as a controlling factor for actuating the adjusting means of the electrodes in one or the other direction.

A further object of the present invention is to provide a device including a motor and associated means for adjusting the electrodes of an arc furnace, and a mechanism which is responsive to very small deviations from a predetermined ratio between the current and voltage of the arc of a furnace for automatically actuating said motor and associated means to move in one or the other direction.

Another object of the invention resides in the provision of means for supplying the adjusting motor at each deviation from the predetermined ratio with a driving impulse in only one direction of rotation.

Still another object of the invention is the provision of means for making the speed of adjustment of the motor dependent upon the magnitude of each deviation, and for preventing exceeding a given maximum speed even by the largest sudden deviations.

For attaining these objects, the present invention provides circuits including two groups of vapor discharge devices which are controlled in accordance with the ratio of the current to the voltage of the arc in such a manner that at the occurrence of deviations from the predetermined ratio, only one or the other group discharges so as to supply the motor with current to move in one or the other direction of rotation.

Another feature of the invention is the provision of reactance coils of variable inductance in the grid circuits of said discharge devices which affect the phase position of the grid voltage and are preexcited in accordance with the ratio of the current to the voltage of the arc in such a manner that at smaller deviations of the actual from the predetermined ratio, the time lag of ignition of the discharge devices is at first quickly changed, while at larger deviations, the time lag tends to attain a predetermined value, preferably in the neighbourhood of that which corresponds to the full efficiency. Therefore, whatever the magnitude of the deviation, the preexcited reactance coils prevent an advancing of the ignition impulses to a point within the positive half wave earlier than that which corresponds to the full efficiency.

Another feature of the invention is to provide reactance coils of such character that simultaneous ignition of both discharge devices will be avoided without appreciable losses in sensitivity. For this purpose, the reactance coils are preferably of such construction that, at normal operating conditions, the control impulses of both discharge devices lie fully within the negative half-wave of the anode voltage so that no ignition can occur, whereas, at the least deviation from the predetermined ratio, the control impulses advance very quickly toward the positive half wave to effect immediately an ignition of the proper discharge device.

Figure 2:
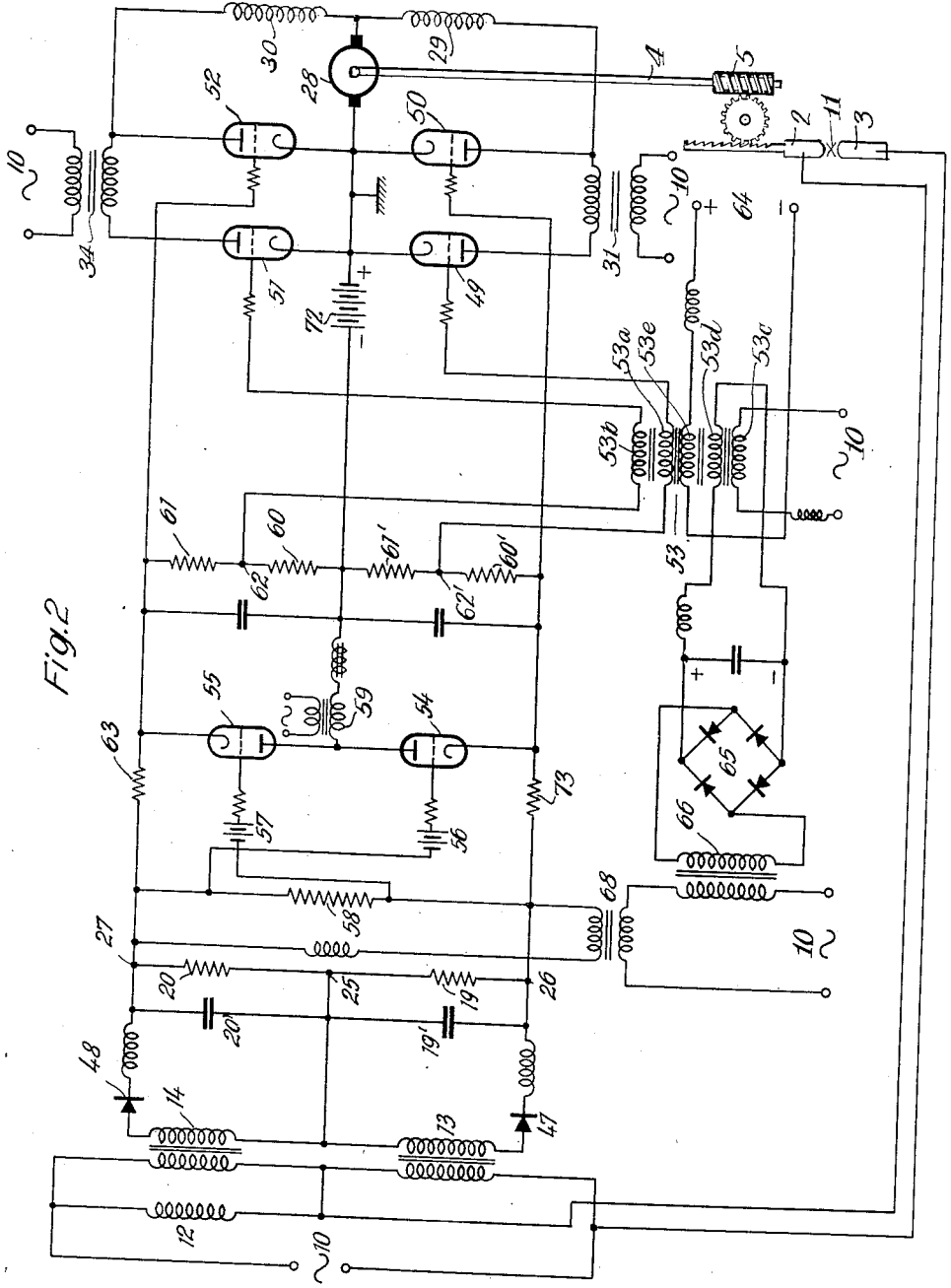

Further objects, features and advantages of the present invention will appear from the following detail description in connection with the drawings, in which Fig. 1 illustrates diagrammatically one embodiment of the invention, while Fig. 2 shows another embodiment thereof.

In Fig. 1, a source of alternating current 10 is connected with the electrodes 2 and 3 for producing the arc 11. The electrodes are arranged in series with a reactance coil 12, while the primary windings of transformers 13 and 14 respectively are connected in parallel to the arc 11 and the reactance coil 12. The secondary winding of the transformer 13 is connected through a reactance 15 and a discharge device 16 having an anode 17 and a cathode 18, with a resistance 19 including a condenser 19' in parallel therewith, while the secondary of transformer 14 is connected with a resistance 20 and a parallel-arranged condenser 20' through a reactance 21 and a discharge device 22 having an anode 23 and a cathode 24. Since the resistances 19 and 20 are connected with each other on one side at midpoint 25, their outer terminals 26 and 27 carry a unidirectional voltage which may be a negative or positive bias depending upon whether the voltage of the transformer 13 is higher than the voltage of transformer 14 or vice versa. The reactance coils 15 and 21 and condensers 19' and 20' serve for smoothening the unidirectional voltage, as is common in the art. A motor 28 is connected with the electrodes by means of a suitable gear or the like, represented in the drawings by a shaft 4 and a worm gear 5. The adjusting motor 28 is a series-wound direct current motor having two exciting windings 29 and 30, the winding 29 being provided for right-hand rotation and the winding 30 for left-hand rotation. The current for the circuit formed of the exciting winding 29 and the motor armature 28 is supplied, through discharge devices 32, 33 in two-way rectifier connection, by a transformer 31 which is likewise connected to the source of alternating current 10. The circuit comprising the exciting winding 30 receives its energy from a transformer 34 by way of discharge devices 35 and 36 in similar two-way rectifier connection. The control voltage for the grid transformers 37 and 38 of the rectifier valves 32, 33 and 35, 36 respectively, is supplied by Wheatstone bridge circuits composed of saturable and preexcited reactance coils and inductive resistances. Thus, the bridge circuit for supplying the control potential for the discharge devices 32 and 33 contains two resistances 41 and 42 and the operating windings 39b and 40b of two saturable control reactances 39 and 40. Similarly, the corresponding bridge circuit for the discharge devices 35 and 36 includes two resistances 45 and 46 and the operating windings 43b and 44b of two saturable control reactances 43 and 44. These bridge circuits are connected in parallel to the source of alternating current 10.

The potentials provided by the resistances 19 and 20 are supplied to the exciting windings 39c, 40c and 43c, 44c of the control reactances 39, 40 and 43, 44. One of these exciting circuits extends from the lower terminal 26 of the resistance 19 through the exciting windings 39c and 40c and back through electrodes 45 and 24 of discharge device 22 to the upper terminal 27 of the resistance 20. Due to the valve effect of device 22, the exciting windings 39c and 40c are energized only when the lower terminal 26 of resistance 19 carries a positive potential relative to the upper terminal 27 of resistance 20. In the same manner, the valve formed by the anode 46 and the cathode 18 of discharge device 16 has the effect that the windings 43c and 44c of the reactances 43 and 44 are traversed by energizing current only when the upper terminal 27 of resistance 20 has a positive potential as compared with terminal 26. The valves 16 and 22 thus assure that the time of ignition can be advanced only in the one or the other bridge circuit, until the respective group of discharge devices is ignited. A simultaneous actuation of both exciting windings 29 and 30 of the motor 28 is, therefore, made impossible.

As previously mentioned the operating or main windings 43b and 44b of the reactance coils 43 and 44, respectively, form together with resistors 45 and 46 a Wheatstone bridge circuit, which is fed from the A. C. source 10 and from whose output or diagonal points an alternating balance voltage is furnished through transformer 38 to the grid circuits of the discharge devices 35 and 36, while the grid voltages of the discharge devices 32 and 33 are derived from a similar bridge circuit comprising the reactance windings 39b and 40b and the resistors 41 and 42. Such a bridge circuit has the well-known property that at a given and constant input voltage the phase position of the output voltage is varied if the inductance of two diametrically opposite branches of the bridge circuit is varied. The two bridge circuits, as already mentioned, are so adjusted that when the saturable reactors 39, 40, 43 and 44 are unexcited and thus unsaturated and in the state of their maximum inductivity, the output voltages of the bridges lag so much behind the anode voltages of the appertaining discharge devices that these devices cannot be ignited. This unexcited and unsaturated state of the reactors exists so long as no potential difference appears between the terminals 26 and 27, i. e. so long as the arc operates under normal conditions so that the desired ratio of the current intensity to the voltage of the arc prevails. If, however, a deviation from this ratio occurs, a unidirectional voltage appears between points 26 and 27, and one of the reactor groups 39 and 40, or 43 and 44, depending upon the direction of this voltage, is excited by direct current. The reactors, thus magnetized, decrease their inductivity. This shifts the phase position of the alternating output voltage of the bridge in the direction opposite to that of the abovementioned lag. While previously the intersection of the A. C. grid voltage of the appertaining group of discharge devices (32 and 33, or 35 and 36) with the ignition characteristic of these devices fell into the range of the negative half waves of the anode voltage, the phase advancing of the grid voltage has the result that now the intersection lies in the range of the positive half waves of the anode voltage so that the discharge devices are ignited. This, in turn, effects energizing either motor winding 29 or 30, depending upon which group of discharge devices is ignited, and the adjusting motor 28 starts running in the corresponding direction. The speed of the motor depends on the amount of the phase displacement of the grid voltage relative to the anode voltage of the operative discharge group. This phase displacement, on the other hand, depends on the intensity of the current energizing the windings 39c and 40c, or 43c and 44c of the reactors 39 and 40, or 43 and 44, and thus on the degree by which the condition of the arc deviates from normal.

When the premagnetizing current of a saturable reactor is gradually increased, the inductivity of the reactor decreases at first very rapidly. At higher intensities of the current, the increase in inductivity proceeds at a slower pace and approaches a maximum limit. Accordingly, the phase advancement of the grid voltage in the above-described arrangement occurs very rapidly at small departures of the arc conditions from the normal state, but tends toward a limit which it does not exceed under any conditions. This limit of the obtainable phase displacement is preferably so adjusted that it corresponds to that of the maximum efficiency of the discharge devices. The rapid phase advancement of the grid voltage at small departures from the normal ratio of the intensity and voltage of the arc current ensures an extreme sensitivity without incurring the danger that at larger departures the phase advancement could ever become disturbingly high.

The modification of the invention shown in Fig. 2 is similar to that of Fig. 1 in that between the outer terminals 26 and 27 of series-connected resistances 19 and 20 a D. C. voltage is produced whose magnitude and direction depend upon the ratio of the current and the voltage of the arc 11 between the electrodes 2 and 3. The valves for rectifying the alternating voltages of transformers 13 and 14 are static rectifiers 47 and 48. The adjusting motor 28, coupled with the electrode 2 through the transmission elements 4 and 5, has two exciting windings 29 and 30 for right or left-hand rotation. In further similarity to Fig 1, two groups of discharge devices 49, 50 and 51, 52 are provided in each of the energizing circuits of windings 29 and 30. These discharge devices are so arranged in half-wave rectifier connection that the current can flow through only one of the tubes 49 and 51 at a time. The discharge devices 50 and 52 are provided for bridging the motor 28 including the exciting winding 29 or 30, and therefore permit a continued flow of the current in the negative half wave under the influence of the inductance of the motor windings.

The grid circuits of the discharge devices 49 and 51 are provided with short positive control impulses which are produced in a known manner by a highly saturated transformer 53 preexcited by direct current. The transformer 53 has two secondary windings 53a and 53b connected with the grid circuits of the discharge devices 49 and 50 respectively, a primary winding 53c fed with a sinusoidal alternating current from source 10, and two D. C. exciting windings 53d and 53e which counteract each other. The magnet core of transformer 53 is so dimensioned that the alternating current in the primary 53c magnetizes the core up to far above the saturation bend of the magnetization curve. Accordingly, provided the D. C. windings 53d and 53e are not energized, a change in the magnetic flux occurs only when the alternating current passes through its zero value. The time curve of the flux variation is approximately rectangular. Each time the current curve passes through zero, a short voltage impulse is induced in the two secondaries 53a and 53b and is fed to the grids of the discharge devices. If now one or both windings 53d and 53e are supplied with direct current, the resulting magnetomotoric force is composed of the A. C. ampere windings of the primary 53c and the D. C. ampere windings of the exciting windings 53d and 53e. As a result, the time curve of the magnetomotoric force remains sinusoidal, but is displaced in vertical direction relative to the zero axis so that the passages of the magnetomotoric force through its zero value are shifted in time relative to the cycle of the alternating current. Consequently, the impulses induced in the secondaries 53a and 53b are also phase shifted relative to the A. C. cycle.

So long as the electrodes are in proper position, the impulses issuing from windings 53a and 53b cannot cause an ignition of the discharge devices 49, 51, since the impulses are superposed by the negative grid bias supplied by the rectifier 48. The peaks of the impulses, therefore, at first do not extend beyond the critical grid voltage where ignition occurs. As soon as the operation of the furnace deviates from the predetermined condition, the grid circuit of one of the tubes 49 or 51 is supplied with a further direct current potential which counteracts the negative bias so that the ignition impulses become effective.

For this purpose the auxiliary discharge devices 54 and 55 are provided. The grids of these devices, when in normal condition, are merely under the influence of the blocking grid potential sources 56 and 57 so that both tubes are without current. However, as soon as a difference in potential arises between the terminals 26 and 27 of resistances 19 and 20 and, therefore, between the terminals of the resistance 58, either the tube 54 or the tube 55 becomes conductive, depending upon whether the difference of potential is positive or negative. The anode voltage for these two tubes 54, 55 is supplied by the transformer 59. If, for example, the upper auxiliary discharge vessel 55 has ignited, a current is produced in resistances 60 and 61 which shifts the potential of the midpoint 62 between these resistances in the positive direction. Midpoint 62 is connected with the grid of the discharge vessel 51. The voltage impulses now become effective in the grid circuit of this tube and ignite the same within each positive half wave of the anode voltage at a moment depending on the phase position of the voltage impulses relative to the anode voltage. The operation of the circuit including resistances 60' and 61' and the midpoint 62' is the same as that of resistances 60 and 61, with the exception that it acts upon tube 49 and causes the motor 28 to run in the opposite direction of rotation.

In the particular connection shown in Fig. 2 of the discharge devices 49, 50 and 51, 52 for controlling the motor 28, it is of importance that during the operation of one group of discharge devices, the discharge device of the other group which serves to bridge the motor 28, remains blocked. If such blocking would not occur, a closed circuit would be formed extending through the respective motor winding 29 or 30 which should not be energized, and thence through the bridging device of the inoperative group, whereby the inductance of the active exciting winding would be practically overcome. The bridging device, therefore, must also be provided with control grids. For operating the motor 28, the bridging device corresponding to the respective direction of rotation must also be supplied with suitable ignition potentials. The blocking potential for the discharge devices 50 and 52 is produced by the battery 72 which is also connected with the discharge devices 49 and 51 for the same purpose. Simultaneously with the increase of the grid potential of tube 51, also the grid potential of tube 52 is increased by the direct potential obtained from resistances 60 and 61, so that tube 52 is released. The high resistances 63 and 73 are designed to prevent the potentials of transformers 13 and 14 from influencing resistances 60, 61, 60', 61'.

It has been mentioned above that when a deviation from the desired operation occurs, one or the other group of discharge devices begins to carry current. The degree of the occurring phase shifting of the control impulses depends, as previously indicated, upon the phase position of the voltage impulses induced in the transformer windings 53a and 53b. This phase position depends upon the direct current preexcitation of the transformer 53 which again depends upon the degree of the departure from normality of the current conditions of the arc to be controlled. This dependency is obtained in the following manner. The transformer winding 53e is excited by a preadjusted direct current source 64. The opposing winding 53d is excited by direct current produced by the rectifier system 65 fed through transformer 66 by a source of alternating current 10. The resulting direct current excitation of the transformer 53, therefore, decreases as the last-mentioned direct current excitation increases. The alternating current circuit of rectifier 65 is also provided with a control reactance 68 which is preexcited by the direct current voltage across the resistance 58.

Any D. C. voltage occurring at the terminals of resistance 58 therefore reduces the inductance of the reactance 68 regardless of whether the voltage is negative or positive. The magnitude of the reduction, however, depends upon that of the voltage at the terminals of resistance 58. If the excitation of the transformer winding 53e through the source 64 is so adjusted that with a practically unexcited control reactance 68 the voltage impulses induced in windings 53a and 53b of the transformer lag very considerably within the positive half wave of the anode voltage of the discharge devices 49 or 51, an increase of the preexciting current in the control reactance 68 will advance these voltage impulses at first quickly and then more and more slowly. As soon as the reactance 68 is fully saturated and only its leakage is active, a further advancing of the ignition times does not occur even if the voltage on resistance 58 increases to a still higher value.

I claim:

1. An arrangement for automatically adjusting the electrodes in electric arc furnaces, comprising in combination a circuit for supplying said electrodes with operating current, a motor capable of operating in both directions of rotation for adjusting said electrodes, two sets of grid-controlled electronic devices each being connected with said motor for controlling said motor with respect to a different direction of rotation, circuit means associated with the grids of said electronic devices for controlling said devices with respect to the flow of current therethrough, saturable reactance means of variable reactance forming part of said circuit means so as to effect said control of said electronic devices in dependence upon said variable reactance, and connecting means electrically coupling said reactance means with said circuit of said electrodes so as to energize said saturable reactance means in dependence upon a given ratio of the current and voltage of said operating current, whereby the control of said devices is varied with a high rate of change at small departures from said given ratio and tends toward a predetermined limit at increasing departures.

2. An arrangement for automatically adjusting the electrodes in electric arc furnaces, comprising in combination a circuit for supplying said electrodes with operating current, a motor capable of operating in both directions of rotation for adjusting said electrodes, two sets of vapor discharge devices each having an A. C. anode circuit connected with said motor for controlling said motor with respect to a different direction of rotation and a grid circuit for controlling the discharge current, saturable reactance means of variable reactance associated with said grid circuits so as to control the grid voltage in dependence upon said variable reactance, circuit means connecting said reactance means with said circuit of said electrodes so as to energize said saturable reactance means and thereby vary the effective reactance in dependence upon departures from a given ratio of the current and voltage of said operating current, said reactance means being adjusted relative to said grid circuits and said circuit means to have a reactance of saturation which corresponds to the grid voltage of full efficiency of said discharge devices, and valves forming part of said circuit means and arranged to operate only one of said grid circuits at a time responsive to the direction of said departure, whereby said two sets of discharge devices are controlled to mutual exclusion and at a rate of change which is high at small departures and approaches the value of full efficiency of said devices at increasing departures.

3. An arrangement for automatically adjusting the electrodes in electric arc furnaces, comprising in combination a circuit for supplying said electrodes with operating current, a motor capable of operating in both directions of rotation for adjusting said electrodes, two sets of vapor discharge devices each having an A. C. anode circuit connected with said motor for controlling said motor with respect to a different direction of rotation and an A. C. grid circuit, saturable reactance means of variable reactance associated with said grid circuits so as to vary the phase position of the grid voltage relative to that of said anode circuit in dependence upon variations of said reactance, and connecting means electrically coupling said reactance means with said circuit of said electrodes so as to energize said saturable reactance means in dependence upon a given ratio of the current and voltage of said operating current, whereby the control of said devices is varied with a high rate of change at small departures from said given ratio and tends toward a predetermined limit at increasing departures.

4. An arrangement for automatically adjusting the electrodes in electric arc devices, comprising in combination a circuit for supplying said electrodes with operating current, a motor capable of operating in both directions of rotation for adjusting said electrodes, two sets of vapor discharge devices each having an A. C. anode circuit connected with said motor for controlling said motor with respect to a different direction of rotation and an A. C. grid circuit, saturable reactance means of variable reactance associated with said grid circuits so as to vary the phase position of the grid voltage relative to that of said anode circuit in dependence upon variations of said reactance, said reactance means comprising an A. C. reactance coil connected in each of said grid circuits and D. C. exciting windings for controlling the effective reactance of said reactance coils, circuit means connected with said exciting windings for supplying said windings with direct current, said circuit means being electrically coupled with said electrode circuit so as to energize said exciting windings in accordance with the direction and magnitude of departures from a given ratio of the current and voltage of the current in said electrode circuit, whereby the control of said devices is varied with a high rate of change at small departures from said given ratio and tends toward a predetermined limit at increasing departures.

5. An arrangement for automatically adjusting the electrodes in electric arc devices, comprising in combination a circuit for supplying said electrodes with operating current, a motor capable of operating in both directions of rotation for adjusting said electrodes, two sets of vapor discharge devices each having an A. C. anode circuit connected with said motor for controlling said motor with respect to a different direction of rotation and an A. C. grid circuit, saturable reactance means of variable reactance associated with said grid circuits so as to vary the phase position of the grid voltage relative to that of said anode circuit in dependence upon variations of said reactance, said reactance means comprising an A. C. reactance coil connected in each of said grid circuits and D. C. exciting windings for controlling the effective reactance of said reactance coils, circuit means for supplying said windings with direct current, said circuit means comprising two series-connected resistors connected with said exciting windings, one of said resistors being coupled with said electrode circuit to have a voltage drop depending upon the current in said electrode circuit, said other resistor being coupled with said electrode circuit to have a voltage drop depending upon the voltage in said electrode circuit, whereby the direction and magnitude of the total voltage across said two resistors active on said exciting windings depend upon the departure of the ratio of current and voltage in said electrode circuit from a given value, and valves also forming part of said circuit means for rendering the operation of said two sets of discharge devices mutually exclusive responsive to the direction of said total voltage.

6. An arrangement for automatically adjusting the electrodes in electric arc devices, comprising in combination a circuit for supplying said electrodes with operating current, a motor capable of operating in both directions of rotation for adjusting said electrodes, two sets of vapor discharge devices each having an A. C. anode circuit connected with said motor for controlling said motor with respect to a different direction of rotation and a grid circuit for controlling the discharge current, individual circuit means allotted to each of said set of devices for varying the phase position of the voltage effective in the grid circuit of said set relative to the phase of the voltage of said anode circuit, said individual circuit means comprising an A. C. bridge network having output terminals connected with said grid circuit and bridge branches containing saturable reactors, each of said reactors having a main reactance coil electrically connected in said bridge network and an exciting winding magnetically coupled with said coil, two series-connected resistors connected with said exciting windings, one of said resistors being coupled with said electrode circuit to have a voltage drop depending upon the current in said electrode circuit, said other resistor being coupled with said electrode circuit to have a voltage drop depending upon the voltage in said electrode circuit, whereby the direction and magnitude of the total voltage across said two resistors depend upon the departure of the ratio of current and voltage in said electrode circuit from a given value, and valves interposed between said resistances and said exciting windings so as to energize the exciting windings of only one of said two bridge networks at a time depending upon the direction of said total voltage across said two resistances.

7. An arrangement for automatically adjusting the electrodes in electric arc devices, comprising in combination a circuit for supplying said electrodes with operating current, a motor capable of operating in both directions of rotation for adjusting said electrodes, two sets of vapor discharge devices each having an A. C. anode circuit connected with said motor for controlling said motor with respect to a different direction of rotation and an A. C. grid circuit, saturable reactance means of variable reactance associated with said grid circuits so as to vary the phase position of the grid voltage relative to that of said anode circuit in dependence upon variations of said reactance, said reactance means comprising an A. C. reactance coil connected in each of said grid circuits and D. C. exciting windings for controlling the effective reactance of said reactance coils, circuit means for supplying said windings with direct current, said circuit means comprising two series-connected resistors connected with said exciting windings, and two electron tubes each having two anodes and one cathode forming two discharge gaps, one of said discharge gaps of each tube being connected between said resistors and said electrode circuit so as to produce across said series-connected resistors a voltage drop depending in magnitude and direction on the departure from a given ratio of current and voltage in said electrode circuit, said other discharge gap of each tube being interposed between said resistances and said exciting windings.

8. An arrangement for automatically adjusting the electrodes in electric arc devices, comprising in combination a circuit for feeding said electrodes with operating current, a motor for adjusting said electrodes, two groups of grid-controlled vapor discharge devices each having an A. C. plate circuit connected with said motor for controlling said motor with respect to a different direction of adjustment, a grid circuit connected with each group of said discharge devices, said grid circuit comprising saturable inductance means for producing ignition impulses and means for producing a D. C. blocking voltage for preventing the ignition, and circuit means coupling said inductance means with said electrode circuit so as to counteract said blocking voltage in dependence upon departures from a given ratio of current and voltage in said electrode circuit, whereby due to the saturation effect of said inductance means the ignition of said discharge devices is controlled with a rate of change which is high at small departures from said given ratio and tends toward a predetermined limit at increasing departures.

9. An arrangement for automatically adjusting the electrodes in electric arc devices, comprising in combination a circuit for feeding said electrodes with operating current, a motor for adjusting said electrodes, two groups of vapor discharge devices each having an A. C. plate circuit connected with said motor for controlling said motor with respect to a different direction of adjustment and a grid circuit containing saturable transformer means having an A. C. primary winding and two secondaries, each of said secondaries being connected in a different one of said grid circuits for supplying short ignition impulses to said circuits and means for producing a blocking voltage tending to prevent the ignition of said discharge devices, circuit means coupling said grid circuits with said electrode circuit for producing a D. C. voltage counteracting said blocking voltage, said circuit means comprising two series-connected resistances and valve means connected between said electrode circuit and said secondaries whereby said D. C. voltage is dependent as to direction and magnitude on the departure from a given ratio of the current and voltage in said electrode circuit in order to ignite one of said two groups of discharge devices at a time depending on the direction of said departure.

10. An arrangement for automatically adjusting the electrodes in electric arc devices, comprising in combination a circuit for feeding said electrodes with operating current, a motor for adjusting said electrodes, two groups of grid-controlled vapor discharge devices each having an A. C. plate circuit connected with said motor for controlling said motor with respect to a different direction of adjustment, a grid circuit connected with each group of said discharge devices, said grid circuit comprising saturable inductance means for producing ignition impulses and means for producing a D. C. blocking voltage for preventing the ignition, and a network connecting said grid circuits and said inductance means with said electrode circuit, said network comprising a valve means and impedance combination for producing a D. C. voltage depending as to direction and magnitude on the departure from a given ratio of the current and voltage in said electrode circuit, two controllable auxiliary discharge devices for supplying to a different one of said first-mentioned discharge devices a variable voltage counteracting said blocking voltage, and circuit means connected with said network for controlling said auxiliary devices so as to actuate only one of said auxiliary devices at a time depending upon the direction of said deviation.

11. An arrangement for automatically adjusting the electrodes in electric arc devices, comprising in combination a circuit for feeding said electrodes with operating current, a motor for adjusting said electrodes, means for supplying said motor with alternating current, two vapor discharge devices each being connected between said supply means and said motor in one-way rectifier connection for operating said motor in a different direction of rotation and having a grid circuit containing saturable inductance means for producing short ignition impulses and means for producing a blocking voltage tending to prevent the ignition of said device, circuit means coupling said inductance means with said electrode circuit for producing a D. C. voltage counteracting said blocking voltage, said circuit means comprising two series-connected resistances and valve means connected between said electrode circuit and said inductance means whereby said D. C. voltage is dependent as to direction and magnitude on the departure from a given ratio of the current and voltage in said electrode circuit in order to ignite one of said two groups of discharge devices at a time depending on the direction of said departure, and a second discharge device connected with each of said first-mentioned current-supplying discharge devices so as to bridge said motor in order to maintain the current flow during the stop phase of said appertaining first-mentioned discharge device, said second discharge device having a grid circuit connected with said circuit means so as to be operative only when said first-mentioned device is ignited.

12. An arrangement for automatically adjusting the electrodes in electric arc devices, comprising in combination a circuit for feeding said electrodes with operating current, a motor for adjusting said electrodes, means for supplying said motor with alternating current, two vapor discharge devices each being connected between said supply means and said motor in one-way rectifier connection for operating said motor in a different direction of rotation and having a grid circuit containing saturable inductance means for producing short ignition impulses, circuit means connecting said grid circuits and said inductance means with said electrode circuit, said circuit means comprising a valve network coupled with said electrode circuit to produce a D. C. voltage depending as to direction and magnitude on the departure from a given ratio of the current and voltage in said electrode circuit, two auxiliary discharge devices for supplying individually to each of said first-mentioned discharge devices a variable voltage counteracting said blockage voltage, and control means for actuating one of said auxiliary devices at a time depending upon the direction of said deviation, two additional discharge devices each being connected with a different one of said first-mentioned discharge devices and bridging said motor so as to maintain the current flow during the stop phase of said appertaining first-mentioned discharge device, said additional discharge devices having each a grid circuit connected with a different one of said auxiliary discharge devices so as to be operative only when said appertaining first-mentioned discharge device is in operation.

13. An arrangement for adjusting the electrodes of an arc device, in particular an arc furnace, comprising in combination a circuit for supplying current to said electrodes, a motor for adjusting said electrodes, means for supplying alternating current to said motor, two groups of grid-controlled discharge devices connected between said supply means and said motor, each of said groups being arranged to control said motor with respect to a different direction of rotation, a saturable transformer having a secondary winding connected with the grid circuit of each of said discharge devices, a primary for supplying alternating current so as to produce short ignition impulses in said secondary, and a premagnetizing winding for controlling the phase position of said ignition impulses relative to the cycle of said alternating current to be supplied through said discharge devices to said motor, circuit means coupling said premagnetizing winding with said electrode circuit so as to energize said premagnetizing winding in dependence upon the departure from a given ratio of the current and voltage in said electrode circuit, and auxiliary control means for selectively actuating and blocking said groups of discharge devices, said auxiliary control means being connected with said circuit means for actuating only one of said groups at a time depending on the direction of the departure from said ratio, whereby the phase of said ignition impulses is shifted from an inoperative position into igniting position so as to control said discharge devices in dependence upon the magnitude and direction of said departure.

14. In an arrangement according to claim 13, said circuit means for premagnetizing said transformer comprising a rectifier arrangement connected with said premagnetizing winding, auxiliary means for supplying alternating current to said rectifier arrangement, a saturable reactor of variable reactance connected with said auxiliary current supply means so as to vary the direct current energization of said premagnetizing winding in dependence upon the reactance variations of said saturable reactor, said reactor having an exciting coil for controlling its reactance, and electric coupling means between said exciting coil and said electrode circuit for energizing said coil in accordance with departures of the ratio of the current and the voltage in said electrode circuit from a given value.

KLAUS FREUDENHAMMER.